Figure 1:
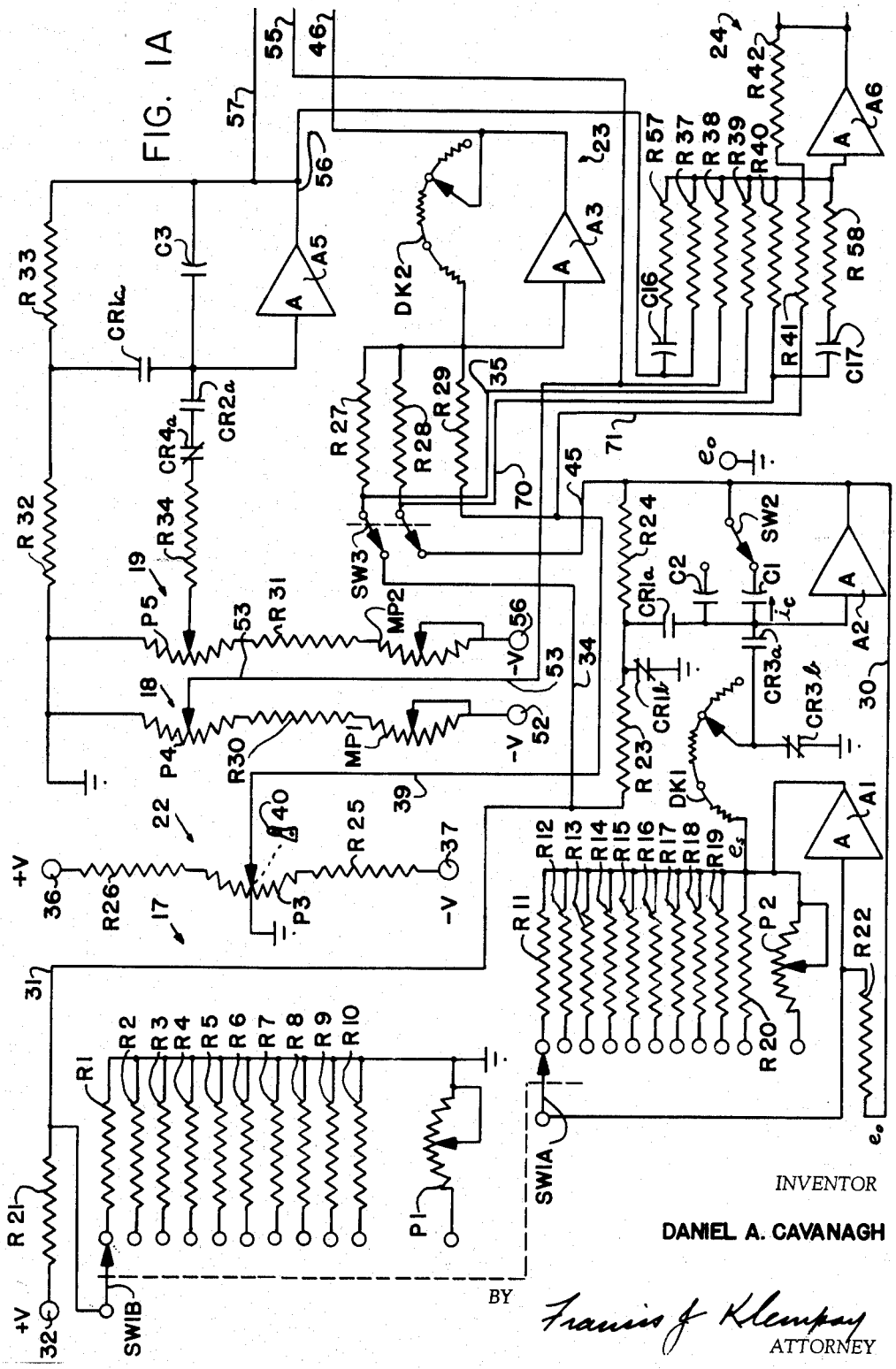

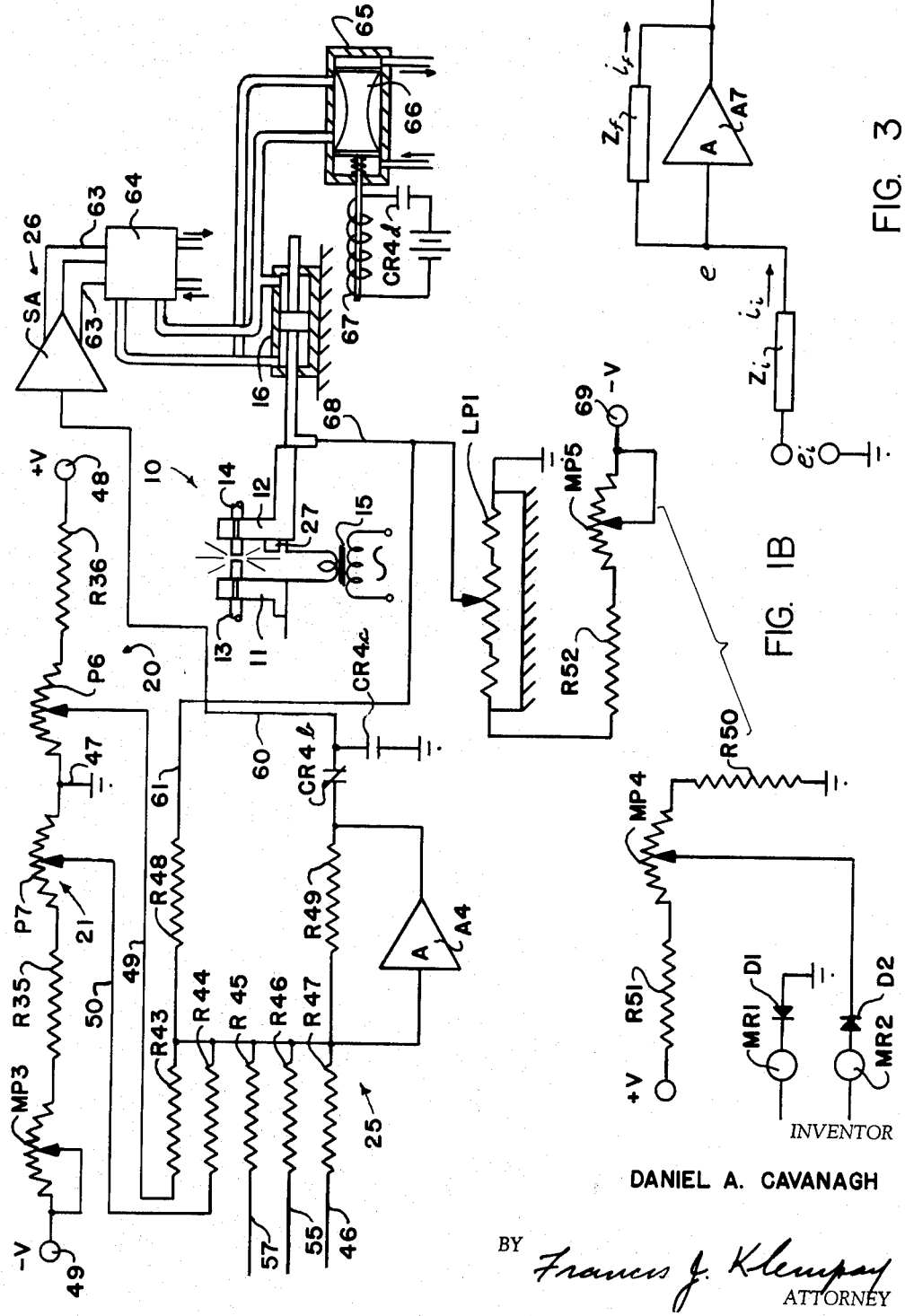

Aug. 31, 1965 D. A. CAVANAGH 3,204,078
ELECTRO-HYDRAULIC CONTROL FOR FLASH WELDERS
Filed June 27, 1960 4 Sheets-Sheet 4

INVENTOR
DANIEL A. CAVANAGH
BY
Francis J. Klempay
ATTORNEY

United States Patent Office 3,204,078
Patented Aug. 31, 1965

3,204,078
ELECTRO-HYDRAULIC CONTROL FOR
FLASH WELDERS
Daniel A. Cavanagh, Willowdale, Ontario, Canada, assignor to The Taylor-Winfield Corporation, Warren, Ohio, a corporation of Ohio
Filed June 27, 1960, Ser. No. 39,029
15 Claims. (Cl. 219—97)

The present invention relates generally to the welding art and more particularly to the provision of a highly improved electro-hydraulic control circuit for flash welders. As will be understood by those skilled in the art, a flash welder comprises a stationary platen upon which one workpiece is firmly clamped while a second workpiece is clamped on a movable platen. The initial spacing between the platens is accurately set and thereafter the movable platen is moved toward the stationary platen while flashing voltage is supplied to the workpieces. A flashing or arcing takes place between the adjacent ends of the workpieces whereby any irregularities are removed therefrom and the ends of the workpieces are heated and softened. Upon continued movement of the movable platen the ends of the workpieces engage and considerable force is applied to complete the weld therebetween.

One of the variables in flash welding operations which effects the quality of the resultant weld is the manner and the speed of which the platens are moved relatively to each other. Experimental tests have indicated that certain patterns of movement between platens are more effective than others in completing successful flash welding operations. For example, exponential patterns of movement between the platens during at least the flashing portion of a flash welding operation have been found to be well adapted for most flash welding operations. Heretofore such patterns of movement have been provided by properly contoured mechanical cams and cam follower means operating through suitable apparatus. These arrangements have many inherent limitations and disadvantages and are characterized by their inability to control the relative movement between the platens in a highly accurate and very precise manner. Also, each time a different pattern of movement is desired it is necessary to replace the mechanical cam and adjust the control apparatus. This results in the flash welder being out of production for considerable periods of time which is especially objectionable when the flash welder is employed in a continuous processing line. Further, regardless of the care taken in the design of the system, the relative movement between the platens is somewhat erratic due to the various irregularities that result in the normal machining of the mechanical cam and because such a cam is subject to wear upon the continued usage thereof. It is impossible with prior art apparatus to control the relative positions of the platens at any given instant of time during a flash welding operation within the small tolerances required. All of the above have somewhat limited the utilization of flash welding apparatus and have resulted in defective welds.

It is the primary or ultimate object of this invention to provide an electro-hydraulic control which is adapted to control the relative movement between the platens and workpieces being welded in a continuous and highly precise manner and in accordance with a predetermined pattern.

Another object of the invention is to provide a control for flash welders which embodies electrical means for generating control signals that are proportional to the desired relative movement between the workpieces and platens. As will be be hereinafter more fully explained, an electronic cam portion of the control is adapted to generate any one of a family of exponential curves to control at least a portion of the movement between the platens during a flash welding operation. The pattern of movement best adapted for any given workpieces is easily selected and the welding operation is completed in a highly accurate and precise manner.

Still another object of the present invention is to provide an electro-hydraulic control for flash welders wherein all variables of the relative movement between the platens are adjustably and accurately controlled. For example, the initial opening between the platens, the approach rate of the platens relative to each other, the manner in which the platens move relatively to each other during flashing time and the extent of flashing time may be easily adjusted by employing the control herein disclosed.

A further object of this invention is to provide a control having the characteristics above set forth which is highly simplified in construction and in operation.

The above, as well as other objects and advantages, will become more readily apparent upon consideration of the following specification and accompanying drawing wherein there is disclosed an illustrated embodiment constructed in accordance with the teachings of this invention.

Figure 2:
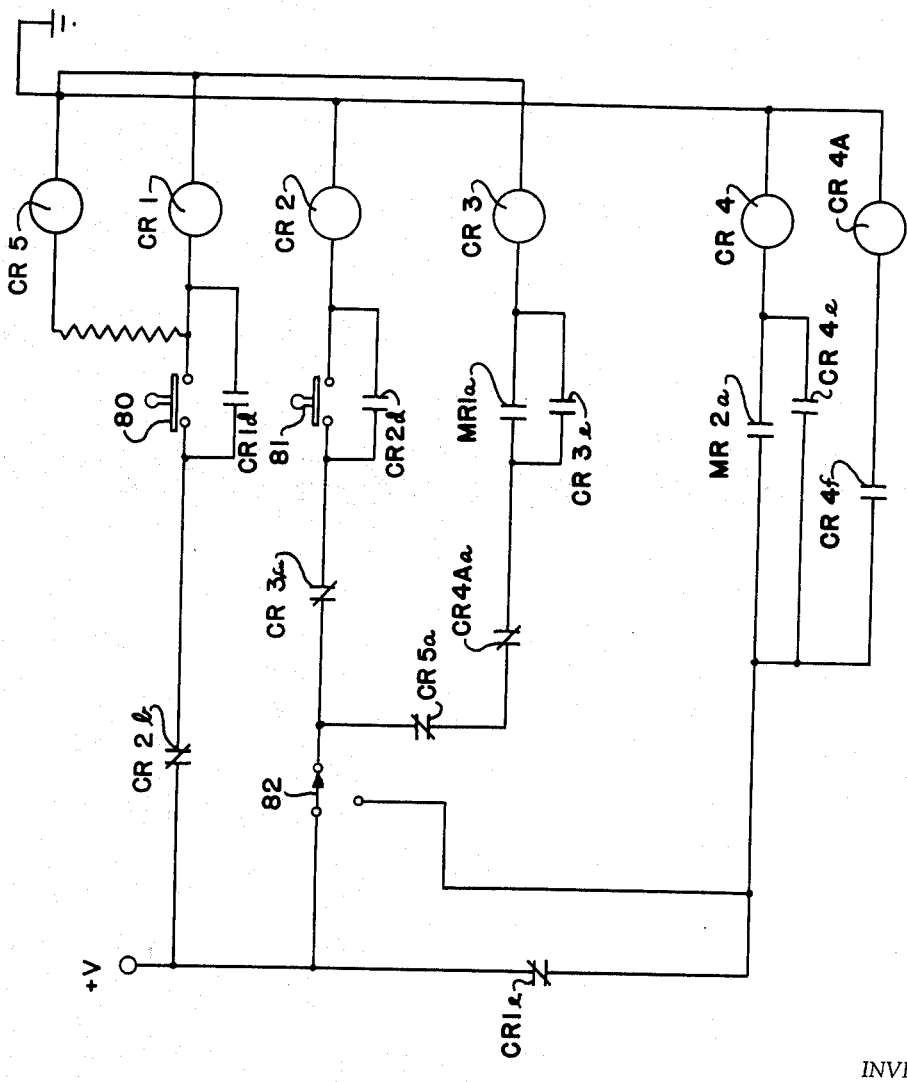
Figure 6:
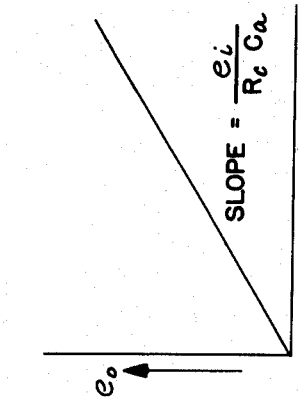
Figure 5:
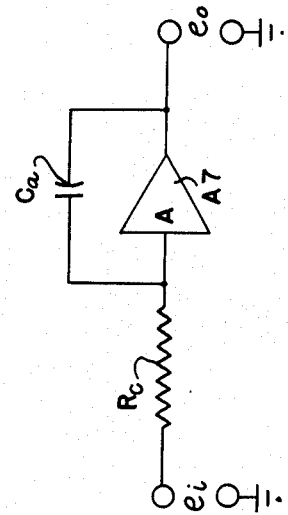
Figure 4:
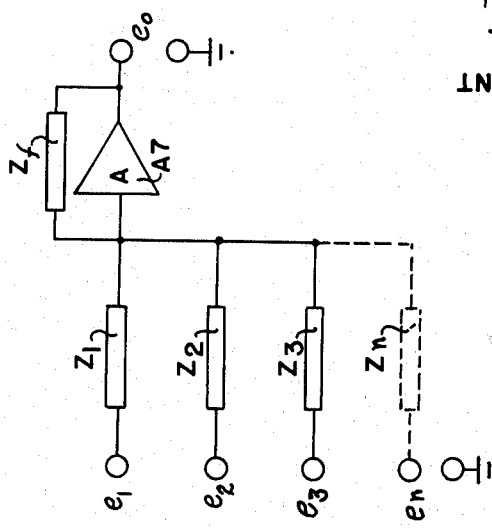
Figure 7:
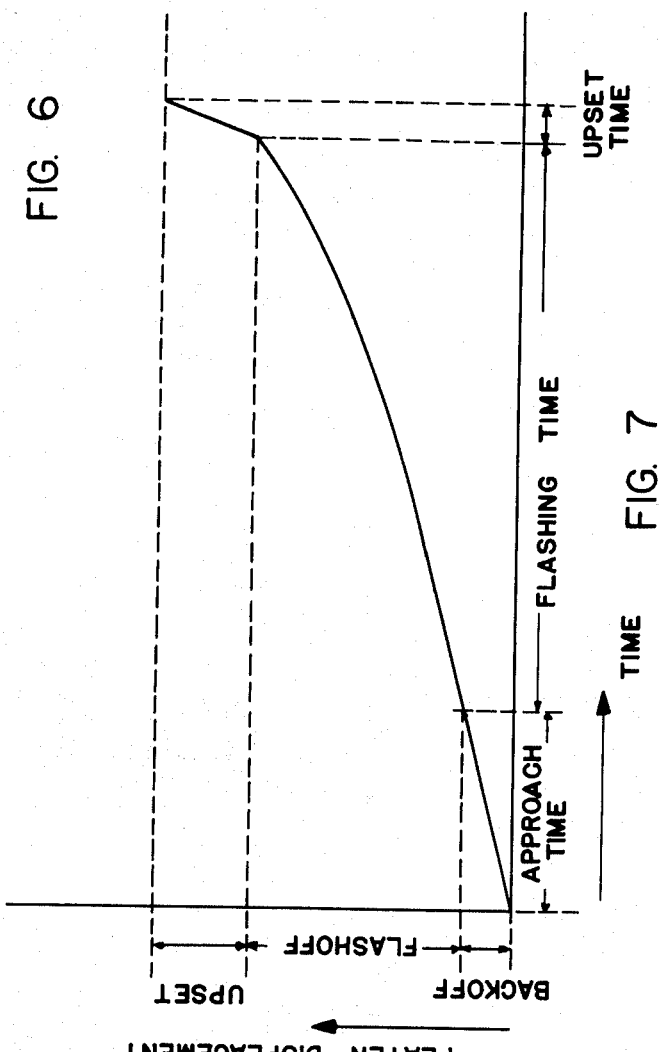

In the drawing:
FIGURE 1, composed of FIGURES 1A and 1B, is a schematic of the electro-hydraulic control for flash welders of this invention;
FIGURE 2 is a schematic showing the connection of the various control relays employed to sequence the electro-hydraulic control shown in FIGURE 1;
FIGURES 3, 4 and 5 are simplified schematics used to explain the theory and basis of operation of certain portions of the control shown in FIGURE 1;
FIGURE 6 is a graph of output voltage plotted against time for the circuit shown in FIGURE 5; and
FIGURE 7 is a graph of platen displacement versus time for a representative flash welding operation.

Referring now to the drawing, and initially to FIGURE 1 thereof, the reference numeral 10 designates a conventional flash welder comprising a stationary platen 11 and a movable platen 12 which are adapted to clamp and hold workpieces 13 and 14, respectively.

Flashing and welding current is supplied to the workpieces by means of a suitable welding transformer 15 whose primary is interconnected to a potential source by welding current control apparatus of a type well known in the art. Such control apparatus may comprise inversely connected pairs of ignitrons and is adapted to regulate the current flowing in the workpieces in accordance with a predetermined pattern. The movable platen 12 is moved longitudinally toward and away from the stationary platen 11 by means of a fluid actuator 16. Forward movement of the platen 12 is limited by a mechanical stop 27 which is preferably adjustable to control the final spacing between the platens 11 and 12 at the end of the upset portion of a flash welding operation.

The apparatus for controlling the relative movement between the platens during a flash welding operation is shown in FIGURE 1 of the drawing and comprises the following portions: electronic cam 17, back off 18, approach rate 19, zero adjust 20, initial platen opening 21, manual operation 22, flash off 23, voltage level control 24, servo valve input 25 and machine control 26. The function and operations of these various portions of the control will be hereinafter more fully described and explained.

*Theory*

Many portions of the control utilize operational amplifiers which are designated by the reference indicia A1 through A6 in FIGURE 1 of the drawing. An operational amplifier is a direct current voltage amplifier having an extremely large (ranging from 10,000 to 10,000,000) real and negative gain utilizing negative feed back to achieve linearity and stabilize the gain. The input current to an operational amplifier is negligible and it may be assumed that the grid current is zero although the grid appears as a virtual ground. Operational amplifiers are known in the art and, other than their use herein, do not, in and of themselves, form a portion of the present invention. Such an amplifier is available from George A. Philbrick Research, Inc., 230 Congress Street, Boston 16, Massachusetts, under the trade name Universal Stabilized Amplifier USA–3. The technical characteristics of this particular amplifier are completely set forth in Philbrick's technical bulletin SL5M. Other amplifiers having similar technical characteristics can, of course, be employed in the control of the present invention.

Referring now to FIGURE 3 of the drawing, there is shown an operational amplifier A7 having a gain A which is connected in a circuit comprising the impedances $Z_i$ and $Z_f$. The voltage $e$ at the amplifier input grid for the disclosed circuit arrangement is:

(1) $$e = \frac{e_0}{A}$$

By applying Kirchhoff's Law that the sum of the currents at any given point is equal to zero and assuming that the grid current is negligible, the following equation is obtained:

(2) $$i_f + i_i = 0$$

The equivalens for the currents are substituted and by solving the resultant equation an expression of the output voltage $e_0$ can be obtained:

(3) $$\left(\frac{e_0}{A} - e_0\right)\frac{1}{Z_f} + \left(\frac{e_0}{A} - e_i\right)\frac{1}{Z_i} = 0$$

(4) $$e_0 = -e_i\left(1 - \frac{1}{1-A\beta}\right)\frac{Z_f}{Z_i}$$

$$\beta = \frac{Z_i}{Z_f + Z_i}$$

Since the gain of the operational amplifier A7 is extremely large, the quantity $$\frac{1}{1-A\beta}$$

in Equation 4 is approximately equal to zero and the output voltage $e_0$ is thus expressed by the relationship:

(5) $$e_0 = -e_i\frac{Z_f}{Z_i}$$

If the impedances $Z_f$ and $Z_i$ are resistances $R_a$ and $R_b$, respectively the resulting equation becomes:

(6) $$e_0 = -\frac{Ra}{Rb}e_i$$

It will be noted that the output voltage $e_0$ is equal to minus the input voltage $e_i$ multiplied by the ratio of $Ra$ divided by $Rb$. Within reasonable limits the value of the quantity $Ra/Rb$ can be made greater or less than one which indicates the active nature of the amplifier A7. The basic multiplication circuit above described is utilized in the electronic cam portion 17 and the flash off portion 23 of the electro-hydraulic control for flash welders.

The schematic circuit shown in FIGURE 4 is similar to the one above described with the exception that a plurality of input voltages ($e_1, e_2, e_3 \ldots e_n$) are provided for the operational amplifier A7. By employing the same derivation utilized to obtain Equation 6 above, the output voltage $e_0$ can be expressed as follows:

(7) $$e_0 = -\left[e_1\frac{Z_f}{Z_1} + e_2\frac{Z_f}{Z_2} + e_3\frac{Z_f}{Z_3} \cdots e_n\frac{Z_f}{Z_n}\right]$$

In the special case where the impedances $Z_f, Z_1, Z_2, Z_3 \ldots Z_n$ are all equal to each other the output voltage $e_0$ is then equal to minus the summation of all of the input voltages:

(8) $$e_0 = -[e_1 + e_2 + e_3 \ldots e_n]$$

This basic circuit arangement is utilized in the flash off portion 23, voltage level control portion 24 and servo valve input portion 25 of the electro-hydraulic control.

The circuit arrangement disclosed in FIGURE 3 may be extended to perform integration when the input impedance is a resistor and thte impedance $Z_f$ is a capacitor. Such a circuit is depicted in FIGURE 5 of the drawing and by employing a derivation similar to that used above the output voltage $e_0$ may be expressed as follows:

(9) $$e_0 = -\frac{1}{RcCa}\int\left(e_i + \frac{e_0}{A}\right)dt$$

The quantity $e_0$ divided by A may be assumed equal to zero since the gain of the operational amplifier A7 is extremely large when compared to the output voltage. If there is an initial charge on the condenser Ca— represented by the term Ec—Equation 9 beoomes:

(10) $$-e_0 = \frac{1}{RcCa}\int_0^t e_i dt - E_c$$

Assuming there is no initial charge on the capacitor Ca the output voltage $e_0$ may be plotted with respect to time (see FIGURE 6) and the slope of the resultant graph is equal to $$\frac{e_i}{RcCa}$$

which indicates that the output voltage is linear with respect to time and that the disclosed circuit performs an integrating function. The electronic cam portion 17 of the control is partially composed of an integrating circuit and such a circuit is also used in the approach rate portion 19.

As previously indicated, it has been found desirable by extensive experimentation that the platens move relative to each other in an exponential manner during the flashing time of a flash welding operation. Mechanical cams have been previously used for this purpose and have been contoured in accordance with the following equation:

(11) $$y = \frac{e^{\alpha x} - 1}{e^\alpha - 1}$$

Where $y$ is equal to the total cam rise in inches, $x$ is the ratio of displacement to the total displacement of the cam; and $\alpha$ is a preselected constant having a value greater than one. The value of the constant $\alpha$ is selected in accordance with the pattern of movement best adapted for a particular flash welding operation. By suitable substitution and mathematical manipulation $y$ can be expressed as follows:

(12) $$y = Be^{\alpha x} - B$$

Where B is a constant for any given value of $\alpha$ and is equal to the quantity $$\frac{1}{e^\alpha - 1}$$

*Electronic cam portion*

The electronic cam portion 17 of the electro-hydraulic control for flash welders is adapted to generate an exponential output control voltage signal which is proportional to the quantity $Be^{\alpha x}$ and a constant output control voltage signal that is proportional to the quantity B. The output signals from the electronic cam portion 17 are substracted in the flash off portion 23 and the resultant control signal is adapted to very accurately and precisely control the relative movement between the platens.

An operational amplifier A1 is connected to act as a multiplier and has an input resistor R22. A plurality of resistors R11–R20 an a potentiometer P2 are adapted to be selectively connected in parallel with the operational amplifier A1 by means of the movable pointer of a selector switch SW1A. In the illustrated embodiment of the invention the movable pointer of switch SW1A is shown in a position to connect the resistor R11 in parallel with the operational amplifier A1. A second operational amplifier A2 is arranged to perfom an integrating function and one of the pair of capacitors C1 and C2 is adapted to be selectively connected in parallel with this operational amplifier by means of the movable pointer of a selector switch SW2. A decade resistor DK1 provides the input impedance for the operational amplifier A2 and is interconnected to the output of the multiplying circuit comprising the operational amplifier A1. Normally open relay contacts CR3a are disposed in the input circuit for the operational amplifier A2 while normally closed relay contacts CR3b connect the decade resistor DK1 to ground. The output voltage signal $e_0$ which appears on conductor 45 of the electronic cam portion is returned as feed back over the conductor 30 to the input of the operational amplifier A1. The arrangement is such that when the relay contacts CR3a and CR3b are open and closed, respectively, any output of the multiplier circuit comprising operational amplifier A1 is grounded through the closed relay contacts CR3b and the grid of operational amplifier A2 is isolated from this multiplier circuit by open relay contacts CR3a. However, when these relay contacts are shifted, the output of the multiplier circuit is used to drive the grid of the operational amplifier A2 and further charge the operatively connected capacitor C1.

As indicated above, either one or the other of capacitors C1 or C2 is connected in parallel with operational amplifier A2 by means of the selector switch SW2. In the illustrated embodiment capacitor C1 is depicted as operatively connected and is supplied with an initial charging voltage over a circuit comprising resistor R23, conductor 31 and a voltage dividing network. The voltage dividing network comprises a resistor R21 and, depending upon the setting of the movable pointer of selector switch SW1B, one or the resistors R1–R10 or potentiometer P2 which are connected in series between ground an a positive terminal 32 of a direct current voltage source. The conductor 31 is connected between the resistor R21 and the operatively connected one of resistors R1–R11 or potentiometer P1. When the relay contacts CR1b and CR1a are shifted from their normal closed and open positions, respectively, the capacitor C1 is charged to an initial voltage level by the above described voltage dividing network. The value or level of this initial voltage or charge is, of course, dependent upon the setting of the movable pointer of selector switch SW1B. The resistors R23 and R24 are of such a magnitude that at this time the operational amplifier A2 has a gain of one whereby voltage signals of opposite polarity and equal magnitude appear on the conductors 34 and 45. When relay contacts CR1a and CR1b are returned to their normal open and closed conditions—but before operation of control relay CR3—the initial charge is held on capacitor C1 whereby equal voltage signals of opposite polarity appear on the conductors 34 and 45. Later, when relay contacts CR3a and CR3b are shifted, the capacitor C1 is charged from its initial value by the output of operational amplifier A1.

The value of the voltage impressed upon capacitor C1 will also depend upon the values of the resistor R23 in the electronic cam portion 17, the resistor R27 in the flash off portion 23 and the resistor R39 in the voltage level control portion 24. The resistor R27 is connected to the conductor 31 by conductor 34 and one movable pointer of a selector switch SW3 while the resistor R39 is connected to the conductor 34 by conductor 35. It will be noted that these resistors are each connected to the grid of an operational amplifier and therefore it may be considered that each of these resistors is connected to an equivalent ground. Thus, the resistors R23, R27 and R39 are disposed in parallel relation with respect to each other and are connected between ground and a point intermediate the resistor R21 and the operatively connected one of the resistors R1–R10 or potentiometer P1.

Considering that the movable pointers of the selector switches SW1A, SW1B and SW2 are in the positions shown, that an initial charge has been placed on the capacitor C1 and that the relay contacts CR3a and CR3b have been shifted, the current through the capacitor C1, represented by the term $i_c$, is:

$$(13) \qquad i_c = +C_1 \frac{de_0}{dt}$$

Since the grid of the operational amplifier A2 is at approximately zero potential, the current $i_c$ flows through the effective resistance of the decade resistor DK1 and:

$$(14) \qquad e_s = R_{DK1} i_c$$

Substituting Equation 13 into Equation 14 we obtain:

$$(15) \qquad es = R_{DK1}\left(+C_1 \frac{de_0}{dt}\right)$$

As previously mentioned, the operational amplifier A1 is employed as a multiplier and the input to the grid of this operational amplifier is the output voltage signal $e_0$ which is supplied to feed back over the conductor 30. From Equation 6 the output $e_s$ of the operational amplifier A1 is equal to:

$$(16) \qquad es = -e_0 \frac{R11}{R22}$$

By equating Equations 15 and 16 and solving for the output voltage signal $e_0$ we obtain:

$$(17) \qquad \frac{de_0}{e_0} = \frac{R11}{R22 R_{DK1} C_1} dt$$

Then by integrating both sides of the equation and transforming to exponential form the expression for $e_0$ becomes:

$$(18) \qquad -e_0 = D e^{\frac{R11}{R22}\left(\frac{1}{R_{DK1} C_1}\right) t}$$

Where D is a constant equal to the initial charge on the capacitor C1.

By comparing Equations 12 and 18 it will at once be apparent that the output voltage signal $e_0$ appearing on conductor 45 is of the same mathematical form as the first quantity in Equation 12. Thus, the constant alpha is equal to the term $$\frac{R11}{R22}$$

while the ratio of displacement to the total displacement of the cam $x$ is equal to the term $$\frac{t}{R_{DK1} C_1}$$

in the analogous electrical circuit. The proper value of alpha is selected by the switch SW1A which connects the desired one of the resistors R11–R20 or potentiometer P2 in parallel with the operational amplifier A1. The constant alpha determines the slope of the exponential output voltage signal and the arrangement is such that any one of an entire family of exponential output signals can be obtained. For example, the resistors R11–R19 and R22 may be of values sufficient to provide constants from 1 to 5 in 0.5 incremental steps while the ratio of R20 over R22 may be equal to 2,718.

The control circuit of the present invention is adapted to end flashing time and effectively disconnect the electronic cam portion when the sum of the output signals of the electronic cam portion 17 exceed a predetermined value. For any given initial charge on the capacitor C1 (represented by the constant D) the flashing time is determined by the quantity $R_{DK1} C_1$ which, of course, is the time constant for the electronic cam portion of the control. The flashing time of a flash welding operation is therefore equal to the value of the capacitor C1 multiplied by the effective resistance of the decade resistor DK1. The capacitor C2 and selector switch SW2 are incorporated to increase the range of flashing times available with the control of the present invention. With either one of the capacitors C1 or C2 operatively connected, the setting of the decade resistor DK1 will determine the flashing time. The decade resistor DK1 is preferably provided with a direct reading dial arrangement and the values of the capacitors C1 and C2 may be selected so that the reading on the dial DK1 is directly proportional to and equal to the length of the flashing time. To vary the length of the flashing time the operator need only adjust the decade resistor DK1.

From the above discussion it will be seen that the initial charge on the operatively connected one of the capacitors C1 or C2 and the particular exponential output signal $e_0$ generated by the electronic cam portion 17 and appearing on the conductor 45 are dependent upon the settings of the mechanically interconnected selector switches SW1B and SW1A, respectively, while the length of the overall flashing time is determined by the setting of the decade resistor DK1. The electronic cam portion 17 of the electro-hydraulic control is adapted to generate output signals which correspond to a selected family of exponential curves. It should be understood, however, that in its broader aspects the present invention is not limited to the particular circuit arrangement described as other such circuit arrangements can be employed for generating other types of output signals. The specific circuit employed in the electronic cam portion 17 of the control will be designed to provide the relative movement desired between the workpieces during flashing time.

*Manual operation portion*

The manual operation portion 22 of the control comprises a pair of resistors R26 and R25 and a potentiometer P3 which are connected in series between the positive and negative terminals 36 and 37 of a direct current voltage source. The center of potentiometer P3 is grounded and, since the values of the resistors R25 and R26 are equal, no voltage signal will appear on conductor 39 when the movable pointer of the potentiometer P3 is positioned in the middle of the resistance winding thereof. The pointer of the potentiometer P3 is mechanically interconnected with a manual control lever 40 and when this lever is moved by the operator, a voltage signal will appear on the conductor 39. The signal on the conductor 39 will be positive or negative depending upon the direction of movement of the movable pointer of the potentiometer P3.

*Flash off portion*

The flash off portion 23 of the electro-hydraulic control has the functions of determining the flash off dimension (the distance of relative movement between the platens during flashing time) and adding the various outputs of the electronic cam portion 17 and the manual operation portion 22 to provide a resultant output signal for controlling the relative movement between the platens. The flash off portion comprises an operational amplifier A3 having a decade resistor DK2 connected in parallel therewith. Three inputs are provided for the grid of the operational amplifier A3 comprising conductor 34, a movable pointer of selector switch SW3 and resistor R27; conductor 45, a movable pointer of selector switch SW3 and resistor R28; and conductor 39 and resistor R29. The signal on the conductor 34 is equal to the initial voltage impressed on the operatively connected one of the capacitors C1 or C2 and is positive while the signal on the conductor 45, as previously explained, is exponential in form during flashing time and is negative. Assuming for the present that the manual operation is not being employed, there will be no signal on the conductor 39.

The operational amplifier A3 is connected as an adder and a multiplier and, since the values of the resistors R27, R28 and R29 are equal, the output of the operational amplifier A3 during flashing time will be equal to:

$$(19) \quad e_0 = K\left[De\frac{R11}{R22}\left(\frac{1}{R_{DK1}C_1}\right)t - D\right]$$

Where K is of the ratio of the effective resistance of the decade resistor DK2 divided by the value of any one of the resistors R27, R28 or R29. It will be noted that Equation 19 is of exactly the same form as Equation 12 with the exception of the multiplying constant K. When manual operation is not employed during flashing time the flash off portion 23 subtracts the initial voltage appearing on either capacitor C1 or C2 from the output of the operational amplifier A2 and multiplies the same by a constant K. The resultant positive voltage output of the flash off portion 23 appears on conductor 46 which serves as an input to the servo valve input portion 25 of the control.

The constant K is a multiplying factor which determines the amount of flash off dimension and since the resistors R27, R28 and R29 are of equal value, the flash off dimension is determined solely by the setting of the decade resistor DK2. As will be later explained, flashing time ends when either the output from the electronic cam portion 17 and/or the manual operation portion 22 reaches a predetermined voltage level and flashing time is ended by the voltage level control portion 24 independently of the flash off portion 23. The setting of the decade resistor DK2 will determine the amount of relative movement between the platens during flashing time. During approach time and when the control is reset preparatory for a welding operation the input signals on conductors 34 and 45 are equal and of opposite polarity whereby, assuming the manual operation portion 22 is not employed, the resultant output of the operational amplifier A3 will be zero and no voltage signal will appear on conductor 46.

The selector switch SW3 is incorporated so that the electronic cam portion 17 may be effectively disconnected from the remainder of the control whereby the relative movement of the platens during flashing time is controlled solely from the manual operation portion 22. However, it should be noted that the lever 40 may be moved to override control signals produced by other portions of the control circuit at any time during a flash welding operation.

*Ram zero adjust portion*

The ram zero adjust portion comprises a resistor R36 and a potentiometer P6 which are connected in series between a ground connection 47 and a positive terminal 48 of a direct current voltage source. It should be apparent that a positive control signal will appear upon the movable pointer of the potentiometer P6. The movable pointer of potentiometer P6 is connected to a conductor 49 leading to the servo valve input portion 25 of the electro-hydraulic control.

The ram zero adjust portion is adapted to place a positive control signal on the conductor 49 which will cause a spacing between the platens of the flash welder which is desired at the end of flashing time and immediately prior to upset time. During such an adjusting operation control signals from all other portions of the control are eliminated or effectively canceled and the movable pointer of potentiometer P6 may be moved until the platens have the spacing desired at the end of flashing time.

*Initial platen opening portion*

The initial platen opening portion 21 comprises a micropotentiometer MP3, a resistor R35 and a potentiometer P7 which are connected in series relation between the ground connection 47 and a negative terminal 49 of a direct current voltage source. The arrangement is such that a negative control signal appears upon conductor 50 which is connected to the movable pointer of potentiometer P7. The conductor 50 leads to and the negative signal thereon serves as an input for the servo valve input portion 25 of the control.

The setting of the movable pointer of the potentiometer P7 determines the initial opening between the platens of the flash welder. This initial opening is equal to the spacing between the platens at the instant flashing time is started as it will be hereinafter more fully apparent.

Back off portion

The back off portion 18 is adapted to control the additional back off spacing between the platens of the flash welder. Thus, the spacing between the welding platens at the very beginning of a flash welding operation is equal to any initial spacing provided by adjustment of the ram zero adjust portion 20 and the initial opening as determined by the initial platen opening portion 21 plus the back off opening which is set by the back off portion 18. During approach time when the platens are moving relatively toward each other through the back off opening distance, the approach rate portion 19 controls the relative movement thereof and thereafter during flashing time when the platens are moving relatively through the initial opening distance the electronic cam portion 17 and the flash off portion 23 control the movement thereof when an automatic flash welding operation is being completed.

The back off portion 18 comprises a potentiometer P4, a resistor R30 and a micropotentiometer MP1 connected in series between the ground connection and a negative terminal 52 of a direct current voltage source and it should be apparent that a negataive output signal will appear on a conductor 53 which is connected to the movable pointer of the potentiometer P4. The value of the negative signal on the conductor 53 will, of course, depend upon the setting of the movable pointer of the potentiometer P4. The negative voltage signal on conductor 53 serves as an input to the voltage level control portion 24 and also as an input to the servo valve input portion 25 over a conductor 55.

Approach rate portion

The approach rate portion 19 has the function of determining the type and rate of relative movement between the welding platens during the back off distance and during approach time immediately prior to flashing time. The approach rate portion herein disclosed is adapted to extend the overall flash welding operation by adding a period of movement at the beginning thereof wherein the movable platen moves at a constant velocity.

The approach rate portion 19 comprises an operational amplifier A5 having a capacitor C3 connected in parallel therewith. A fixed resistance R34 serves as an input impedance for and is connected to the grid of operational amplifier A5 through normally closed relay contacts CR4a and normally open relay contacts CR2a. The resistor R34 is also connected to the movable pointer of a potentiometer P5 which, in combination with resistor R31 and micropotentiometer MP2, is connected in series between ground and a negative terminal 56 of a direct current voltage. A resistor R33 is disposed in parallel relation with respect to the capacitor C3 by a circuit comprising normally open relay contacts CR1c and a resistor R32 is connected between the resistor R33 and ground.

The operational amplifier A5, capacitor C3 and resistor R34 define an integrating circuit of the type shown in FIGURE 5 of the drawing. Thus, a linearly rising positive output voltage signal will appear on the conductor 56 which serves as an input to the voltage level control portion 24 and as an input to the servo valve input portion 25 over the conductor 57. The resistor R34 and capacitor C3 have fixed values so that the slope of the linearly rising positive output signal appearing on the conductors 56 and 57 will depend upon the input voltage to the operational amplifier A5. The input voltage is, of course, determined by the setting of the movable pointer of the potentiometer P5. When the relay contacts CR2a are closed, a negative step voltage is effectively applied to the grid of operational amplifier A5.

It is highly desirable that the relative movement between the platens of the flash welder take place in a continuous and smooth manner during an entire flash welding operation. In order to avoid erratic movement between the platens at the end of approach time and at the beginning of flashing time, care must be taken in the setting of the movable pointer for the potentiometer P5. Thus, the approach rate must be correlated with respect to the flashing time, the flash off distance and the relative movement between the platens during flashing time. The approach rate in inches per unit of time is equal to the flash off distance in inches multiplied by the initial slope at the beginning of flashing time in inches per unit of time divided by the total flashing time. It is contemplated that a chart showing the proper position of the movable pointer P5 for any given settings of the selector switches SW1A and SW1B and the decade resistors DK1 and DK2 will be available to the operator. The relative movement between the platens continues in a smooth and uninterrupted manner during the transition from approach time to flashing time.

Servo valve input portion

The servo valve input portion 25 is adapted to add the various output voltages appearing on the conductors 49, 50, 57, 55 and 46 and to produce a resultant output signal on the conductor 60 which serves as an input to the machine control portion 26. This portion of the control comprises an operational amplifier A4 having the resistor R49 connected in parallel therewith and the input resistors R43–R44, one of which is disposed in each of the conductors 49, 50, 57, 55 and 46. A further input to the operational amplifier A4 is supplied over conductor 61 and through resistor R48 and this input, as will be later explained, is a negative voltage signal which is directly proportional to the instantaneous position of the movable welding platen 12 whereby the signal on the conductor 60 is an error signal equal to the difference between the desired instantaneous position of the movable platen and the actual instantaneous position thereof. The resistors R43–R49 are all of the same value so that the servo valve input portion performs only an adding function. Normally closed relay contacts CR4b are disposed in the conductor 60 while normally open relay contacts CR4c connect the conductor 60 to ground. When these relay contacts are shifted, the servo valve input portion 25 is isolated from the machine control portion 26.

Machine control portion

A servo amplifier SA receives the error voltage signal on the conductor 60 and amplifies and changes this signal into proportional current signals that appear on the conductors 63. A servo valve 64 is disposed in the fluid supply circuit for the fluid actuator 16 and is adapted to meter fluid to the opposite ends of this actuator. The servo valve 64 is, in essence, a proportioning device and when the valve spool thereof is in one position, fluid under pressure will be admitted to one end of the fluid actuator while when the valve spool is moved to the other side of the center line thereof fluid under pressure is supplied to the other end of the fluid actuator. The ports of the servo valve are blocked when the valve spool is in its neutral and central position. The position of the valve spool is controlled by suitable solenoids, for example, which are operated by current signals appearing on the conductors 63. The servo amplifier and servo valve are conventional components well known in the art and do not, in and of themselves, form a portion of the present invention.

The machine control portion 26 further comprises an upset valve 65 whose valve spool 66 is maintained in a position where all ports thereof are blocked. During flashing time the flow of fluid under pressure to the fluid actuator 16 is accurately and precisely controlled by the servo valve 64. At the end of flashing time relay contacts CR4d close to energize solenoid 67 and the valve spool is shifted to supply a very large volume of fluid under pressure to the rear end of fluid actuator 16. The arrangement is such that at the end of flashing time, after the ends of the workpieces have been softened, the movable platen is very quickly moved and under considerable force toward the stationary platen to abut the ends of workpieces and fuse or weld the same to each other.

Connected to and movable with the platen 12 is a pointer 68 which is adapted to traverse a fixed and very accurate linear potentiometer LP1. One end of the potentiometer LP1 is connected to ground while the other end thereof is connected through resistor R52 and micropotentiometer MP5 to a negative terminal 69 of a direct current voltage source. The movable pointer 68 is electrically connected by conductor 61 and resistor R48 to the grid of operational amplifier A4 in the servo valve input portion 25. The linear potentiometer LP1 and movable pointer 68 define a voltage divider which supplies a negative voltage signal on the conductor 61 that is proportional to the instantaneous actual position of the movable platen 12.

The response of the machine control portion to error signals on the conductor 60 is quite rapid and the movable platen 12 follows very accurately and closely the desired pattern of movement.

*Voltage level control portion*

This portion of the control is adapted to sequence in a proper manner the other portions of the control and comprises an operational amplifier A6 having a resistor R42 connected in parallel therewith. An input from the approach rate portion 19 is provided over conductor 56 and through resistor R37 while an input from back off portion 18 is supplied by conductor 53 through resistance R38. Conductors 35 and 70 in conjunction with resistors R39 and R40, respectively, supply inputs from the electronic cam portion 17 while an input of conductor 71 and through resistor R41 is supplied when manual operation is desired. The operational amplifier A6 and its associated circuitry is adapted to act as an adder to provide a resultant control signal since the resistors R37–R42 are all of equal magnitude.

Connected between the output of the operational amplifier A6 and ground is a supersensitive meter type voltage relay MR1 and a rectifier D1. A second output circuit for the operational amplifier A6 comprises a supersensitive meter type voltage relay MR2 and a rectifier D2 which are connected in series to the movable pointer of a micropotentiometer MP4. The micropotentiometer MP4 and resistors R51 and R50 are disposed in series relation between ground and a positive terminal 73 of direct current voltage. The meter relays MR1 and MR2 require a very low energizing potential and react almost instantaneously while yet being adapted to sustain relatively large voltages. As will be hereinafter more fully explained, the meter relay MR1 is adapted to be actuated at the end of approach time to end time and begin flashing time while the meter relay MR2 is energized at the end of flashing time to end flashing time and begin upset time. The shunting circuits comprising capacitor C16 and resistor R57 and capacitor C17 and resistor R58 are provided for the resistors R37 and R40, respectively, to supply a boost in the voltage to operate the meter relays MR1 and MR2 rapidly when relatively fast changing input signals from the electronic cam portion 17 and the approach rate portion 19 are occurring. These shunting circuits are effective to reduce the response time of the meter relays MR1 and MR2.

*Operation*

The remaining portions of the control, including the connections of the various control relays shown in FIGURE 2, will probably be best understood when described in connection with the operation of the electro-hydraulic control for flash welders of the present invention. It will be assumed that a reset switch 80 has been depressed to energize control relays CR1 and CR5 providing that the relay contacts CR2b are closed. A holding circuit is completed for the reset switch 80 through the normally open relay contacts CR1d. At this time the multiplier circuit comprising operational amplifier A1 in the electronic cam portion 17 is grounded through the closed relay contacts CR3b while equal and opposite voltage signals appear on the conductors 34 and 45 as well as on conductor 35 and 70 since relay contacts CR1a and CR1b have been shifted to place an initial charge or voltage on capacitor C1 which is dependent on the setting of the movable pointer of switch SW1B.

The relay CR2 is de-energized so that no input voltage is supplied to the operational amplifier A5 and consequently no voltage signals are evidenced on the conductors 56 and 57. The capacitor C3 is connected in parallel with resistor R33 through closed relay contacts CR1c whereby any residual voltage or charge on the capacitor is dissipated.

The ram zero adjust portion 20 supplied a positive control signal over the conductor 49 to the servo valve input portion 25 while negative signals are evidenced on the conductors 50 and 53, 55 from the initial platen opening portion 21 and the back off portion 18, respectively. The voltage signal on conductor 53 serves as input to the operational amplifier A6. It will thus be seen that the inputs to the operational amplifier A4 when the control is in reset condition comprise a positive signal from the ram zero adjust portion 20, a negative signal from the back off portion 18 and a negative signal from the initial platen opening portion 21. These three input signals are added by the servo valve input portion 25 to produce a resultant positive control signal on the conductor 60 which causes the movable platen to retract from the stationary platen by a distance equal to the sum of the initial platen opening or flashing distance plus the back off distance from the initial spacing between the platens as determined by the setting of the movable pointer of potentiometer P6 in the ram zero adjust portion 20. Of course, any error output signal on the conductor 60 drives the servo amplifier SA to produce proportional current signals on the conductors 63 which in turn operate to control the position of the valve spool in the servo valve 64. The error signal on conductor 60 represents the difference between the desired instantaneous position of the movable platen and the actual instantaneous position of the movable platen (the latter quantity being supplied in feedback over conductor 61). In this manner the movable platen is driven in response to the various inputs to the operational amplifier A4.

With the welding platens so spaced the workpieces are firmly clamped thereon and a flash welding operation may be started. To initiate a welding operation a start switch 81 is depressed to energize control relay CR2 providing relay contacts CR3c are closed and the movable pointer of manual-automatic switch 82 is in the automatic position. Actuation of relay CR2 completes a holding circuit around the start switch 81 through contacts CR2d and relay contacts CR2b open to de-energize relays CR1 and CR5. Equal and opposite output signals still appear on the conductors 34, 45 and 35, 70 since the relay CR3 is de-energized and the initial charge is held on capacitor C1. Thus, if the manual operation portion 22 is not employed, no voltage signal will appear on the conductor 46 interconnecting the flash off portion 23 and the servo valve input portion 25.

Relay contacts CR1c open and relay contacts CR2a close in the approach rate portion 19 whereby a negative step voltage whose magnitude is determined by the setting of the movable pointer of potentiometer P5 is applied to the input of the operational amplifier A5. The operational amplifier A5 is connected in an integrating circuit so that the output signal appearing on conductors 56 and 57 is a linearly rising positive voltage. This linearly rising positive voltage is fed over the conductor 57 and through resistor 45 to the input of amplifier A4. At this time the servo valve input portion 25 adds the negative voltage signals from the initial platen opening portion 21 and back off portion 18 and the positive voltage signals from the ram zero adjustment portion 20 and the approach rate portion 19. The error signal on the conductor 60 will cause the movable platen to move forward at a constant velocity in accordance with the linearly rising signal supplied by the approach rate portion 19. As will be understood, the rate of relative movement between the platens during approach time is controlled by the setting of a movable pointer of potentiometer P5 while the back off dimension is determined by the position of the movable pointer of potentiometer P4. Other contacts of the control relay CR2 are preferably disposed in the welding current control apparatus and are adapted to energize the same whereby current is supplied to the workpieces during approach time to burn off any irregularities or excess length of the workpieces.

During approach time a negative signal from the back off portion 18 and a positive signal from the approach rate portion 19 are supplied over conductors 53 and 56, respectively, to the voltage level control portion 24. The operational amplifier A6 acts as an adder and as the magnitude of the approach rate voltage approaches that of the back off voltage, the output of the operational amplifier A6 becomes less and less positive. When the output of the operational amplifier A6 is highly positive, the meter relay MR1 cannot be energized because the rectifier D1 prevents current from flowing therethrough. Also, the meter relay MR2 is not energized at this time since the positive output of operational amplifier A6 is at a lower voltage than the other side of the meter relay. The other side of the meter relay MR2 is maintained at a predetermined positive voltage through the rectifier D2 in accordance with the setting of the movable pointer of micropotentiometer MP4.

The output voltage of operational amplifier A6 becomes less and less positive and when the approach rate voltage on conductor 56 is effectively equal to the back off voltage on conductor 53 the meter relay MR1 will immediately be energized to end approach time and start flashing time. Closure of the meter relay contacts MR1a (see FIGURE 2) results in the immediate energization of control relay CR3 providing, of course, that the relay contacts CR4a and CR5a are closed. A holding circuit for the meter relay contacts MR1a is completed through relay contacts CR3e.

Energization of relay CR3 de-energizes relay CR2 by opening contacts CR3c whereby relay contacts CR2a in the approach rate portion 19 open to disconnect the grid of operational amplifier A5 from its input source. The capacitor C3 remains charged to its final value whereby the positive voltage appearing on conductors 56 and 57 is equal to and effectively cancels out the negative voltage on conductors 53 and 55 due to the adding functions performed by the operational amplifiers A4 and A6. At this instant (at the end of approach time and the beginning of flashing time) the spacing between the platens is determined by the setting of the movable pointer of potentiometer P7 in the initial platen opening portion 21 since the input signals to the servo input portion 25 appearing on conductors 57 and 55 are of equal magnitude and opposite polarity. Other contacts of relay CR3 disposed in the welding current control apparatus close to continue the flow of current to the workpieces during flashing time.

Energization of control relay CR3 also causes shifting of the relay contacts CR3a and CR3b in the electronic cam portion 17 whereby the output of operational amplifier A1 is connected to the input of operational amplifier A2 and serves to further charge capacitor C1 from its initial level. The electronic cam portion 17 is then operative to generate an exponential output signal on the conductor 45 in the manner previously described which serves as one input to the operational amplifier A3 in the flash off portion 23. A positive and constant control signal appears on the conductor 34 which is of the same magnitude as the initial charge placed on the operatively connected capacitor C1. The servo input portion 25 at this time receives an additional positive input signal over the conductor 46 which is the output of the operational amplifier A3 in the flash off portion 23. In accordance with previous discussion, the settings of the selector switches SW1B and SW1A determine the initial charge placed on the operatively connected capacitor C1 and the particular exponential output signal generated by the electronic cam portion 17 while the length of the flashing time is dependent upon the effective resistance of decade resistor DK1. The setting of decade resistor DK2 determines the flash off dimension or the total amount of relative closing movement between the platens during flashing time. The voltage control signal appearing on conductor 46 is positive and when combined with the other inputs to the operational amplifier A4 causes a negative error signal to appear on the conductor 60. Since the signals on conductors 57 and 55 are of equal magnitude and opposite polarity at this time the operational amplifier A4 effectively receives only those signals from the ram zero adjust portion 20, the initial platen opening portion 21 and the flash off portion 23 whereby the movable platen now moves in exact accordance with the control signal appearing on the conductor 46.

The outputs of the electronic cam portion 17 are also supplied to the voltage level control portion 24 over conductors 35 and 70 and serve as inputs for the operational amplifier A6. Since the control signals from the approach rate portion and the back off portion effectively cancel each other and because the control signal on the conductor 70 becomes more negative during flashing time, the output of operational amplifier A6 will begin to rise in a positive direction. Eventually the output of the operational amplifier A6 will exceed the voltage appearing on the opposite side of the meter relay MR2 and this relay will be energized to end flashing time and to begin upset time. The positive output signal of operational amplifier A6 which is required to actuate meter relay MR2 is dependent upon the setting of the movable pointer of micropotentiometer MP4 and may be 10 volts, for example.

Energization of meter relay MR2 completes a supply circuit for control relay CR4 comprising normally closed relay contacts CR1e and meter relay contacts MR2a. A voltage circuit in parallel with the relay contacts MR2a is provided by the closure of contacts CR4e. Contacts CR4f also close to energize relay CR4A whereby contacts CR4Aa open to de-energize control relay CR3. As a result of the de-energization of relay CR3 and the energization of relay CR4 the contacts CR3a and CR3b are shifted to open the input circuit of operational amplifier A2 in the electronic cam portion 17. Relay contacts CR4a disposed in the approach rate portion 19 open to insure that the operational amplifier A5 is disconnected from its input source. Also, contacts CR4b and CR4c are shifted to transfer the input to the servo amplifier SA to ground which, as will be hereinafter more fully apparent, eliminates the problem of feedback signals appearing on conductor 61 during upset portions of the flash welding operation.

The contacts CR4d are closed whereby the valve spool 66 of the upset valve 65 is shifted to a position where a large volume of fluid under pressure is supplied to the rear end of the fluid actuator 16. The movable platen 12 now moves very quickly in upset toward the stationary platen 11 until the adjustable stop 27 is engaged. It will be noted that at the end of flashing time and at the beginning of upset, the conditions existing in all portions of the electro-hydraulic control are static and that upset is initiated at the proper instant by the meter relay MR2. Current is supplied to the workpieces during upset by the closure of relay contacts of the relay CR4A in the welding current control apparatus.

After upset, the welding operations are completed and the welding workpieces are removed from the platens. Then the reset switch 80 is depressed to energize the relays CR1 and CR5. Relays CR4 and CR4A are disconnected from the source of energizing potential when the relay contacts CR1e open. Energization of relay CR1 causes the welding platens to separate a predetermined distance (equal to the sum of the signals supplied by the initial platen opening portion 21 and the back off portion 18) preparatory to another flash welding operation.

In the above described sequence of operation of the electro-hydraulic control it was assumed that the manual operation portion 22 was not employed at any time during the welding operation. However, if the lever 40 is moved, a voltage signal will appear on the conductors 39 and 71 which serves as an input to the flash off portion 23 and the voltage lever control portion 24. If the lever 40 is moved in the direction to cause a negative voltage to appear on conductors 39 and 71 the signal on conductor 39 is added to any outputs of the electronic cam portion 17 by the operational amplifier A3 to provide an input for the operational amplifier A4 whose output determines the movement of the movable platen. When the negative signal from the manual operation portion 21 and the back off portion 18 equal the positive signal from the approach rate portion 19 the meter relay MR1 will be energized to begin flashing time. Flashing time will end when the output of operational amplifier A6 equals the positive voltage applied to the other side of meter relay MR2 and this relay is energized.

*Summary*

It should now be apparent that I have accomplished the objects initially set forth by providing an extremely versatile electro-hydraulic control for moving the movable platen of a flash welder toward the stationary platen thereof in a highly accurate and precise manner. Of particular importance is the ease in which all variables—including the flashing time, the approach time, the back-off distance, the flashing distance, the particular pattern of an exponential movement between the platens during flashing time, etc.—are adjusted. The control is adapted to very precisely and accurately determine the instantaneous position of the movable platen with respect to the stationary platen and to this end it is contemplated that very stable and accurate components and power sources will be employed throughout the control. One aspect of this invention is that the outputs of the various portions of the control circuit are balanced against each other (added or subtracted by the operational amplifiers) whereby the entire circuit is self compensating for equal and opposite changes in the voltages of the power supplies over long periods of time.

It should also be apparent that revisions and changes may be made in the control without departing from the clear teachings hereof. The control may be revised so that the manual operation portion is used by itself during approach time and that thereafter the welding operation proceeds automatically under the control of the electronic cam portion during flashing time. When the workpieces are loaded in the flash welder touching each other or are forced into contact by the clamping action, it is desirable to further retract the movable platen after the workpieces are clamped. This can be easily accomplished by altering the back off portion 18 to provide for additional spacing between the workpieces after the same have been clamped.

As previously mentioned, the electronic cam portion can also be replaced with other circuitry for generating the particular type of output signals best adapted for any given flash welding operation. The particular pattern of movement may be generated by a curve follower which reproduces electrically a drawn graph. Such an instrument is available from the F. L. Moseley Co., 409 North Fair Oaks Avenue, Pasadena, California. With the use of a curve follower it is only necessary to plot the graph of the desired relative movement between the workpieces and the platens during flashing time and the same will be followed in an accurate manner. Also, the settings of the initial die opening, approach rate, back-off, flash-off, electronic cam portions, etc. for any flash welding operation may be easily accomplished with punched card or tape programing equipment and methods if desired.

It should be further apparent that I have provided a control circuit for very accurately controlling the relative movement between the welding platens of a flash welder which comprises an electronic cam and generating portion having, in the present instance, an exponential signal generator with a selectable potential storage device and feed back subtractor substantially as described.

In view of the above, reference should be had to the following appended claims in determining the true scope and intent of this invention.

I claim:

1. In flash welding apparatus comprising a pair of welding platens adapted to receive and hold workpieces and means to effect relative movement between said platens; the improvement comprising means to generate a first signal corresponding to the desired instantaneous relative spacing between said welding platens over a predetermined time-position pattern, means to generate a second signal corresponding to the actual instantaneous relative spacing between said welding platens, means to compare said signals to an output control signal, and said output control signal actuating said means to effect relative movement.

2. Apparatus according to claim 1 further characterized in that said means to compare comprises an operational amplifier having a first resistor connected in parallel therewith, a pair of input resistors connected in parallel to the grid of said operational amplifier, said resistors being of equal magnitude, first conductor means for supplying said first control signal over one of said input resistors to said grids of said operational amplifier, and second conductor means supplying said second control signal over the other of said input resistors to said grid of said operational amplifier whereby the output signal of said operational amplifier is the resultant of said first and said second signals.

3. In flash welding apparatus comprising a pair of welding platens and means to effect relative movement between said platens; the improvement comprising means to generate a first signal corresponding to the desired relative spacing between said platens during at least a portion of a flash welding operation and over a predetermined time-position pattern, means to generate a second signal corresponding to the actual relative spacing between said platens during said portion of said flash welding operation; means to compare said first and said second signals to provide a resultant control signal, and said control signal actuating said menas to effect relative movement.

4. Apparatus according to claim 3 further characterized in that said means to generate said second signal comprises a voltage source, and means to change the effective value of the voltage supplied by said voltage source in response to actual relative movement between said welding platens.

5. Apparatus according to claim 3 further characterized in that said means to generate said second signal comprises a linear potentiometer having a movable pointer, an effective voltage source connected across said potentiometer, and means to move said movable pointer in exact accordance with the actual relative movement between said platens.

6. Apparatus according to claim 3 further characterized in that said means to compare comprises an adding means, the inputs of said adding means comprising said first and said second signals, and the output of said adding means comprising said output control signal.

7. Apparatus according to claim 6 further characterized in that said adding means comprises an amplifier having a large and real and negative gain, an impedance connected in parallel with said amplifier, and an input impedance connected to the grid of said operational amplifier for each one of said first and second signals.

8. In flash welding apparatus comprising a pair of welding platens and means to effect relative movement between said platens; the improvement comprising means to generate an electrical voltage signal corresponding to the desired instantaneous spacing between the welding platens, said signal controlling the actuation of said means to effect, said means to generate said electrical voltage signal comprising an amplifier, said amplifier having a large real negative gain, a reactive element connected in parallel with said amplifier, an input resistor connected to the grid of said amplifier, and means to supply a step voltage input to said grid of said amplifier over said resistor whereby the output of said amplifier increases linearly with respect to time.

9. Apparatus according to claim 8 further characterized by means to adjust the level of said step voltage input to said grid of said amplifier.

10. In flash welding apparatus comprising a pair of welding platens and means to effect relative movement between said platens; the improvement comprising means to generate an electrical voltage siginal corresponding to the desired instantaneous spacing between the welding platens, said signal controlling the actuation of said means to effect, said means to generate said electrical voltage signal comprising a first amplifier, a second amplifier, said amplifiers having large real and negative gains, an input resistor connected to the grid of each of said amplifiers, the output of said first amplifier being connected to the grid of said second amplifier through said input resistor assoicated with said second amplifier, the output of said second amplifier being supplied in feedback through the other of said input resistors to the grid of said first amplifier, a resitsor connected in parallel with said first amplifier, a capacitor connected in parallel with said second amplifier, means for supplying a constant voltage input to said second amplifier, and said output of said second amplifier increasing exponentially with respect to time.

11. Apparatus according to claim 10 further comprising means to place an initial charging voltage across said capacitor, and means to subtract the value of said initial charging voltage from said output of said second amplifier.

12. Apparatus according to claim 10 further comprising means to change the effective value of the input resistance to said second amplifier to change the time constant of the circuit.

13. In flash welding apparatus comprising a pair of welding platens and means to effect relative movement between said platens; the improvement comprising means to generate a plurality of electrical voltage signals in a timed sequential manner corresponding to the relative spacing and type of relative movement desired during various portions of a flash welding operation, means responsive to said signals for controlling the actuation of said means to effect; and said means to generate comprising means to generate a first rising voltage signal, means to generate a second voltage signal, and means to actuate said second mentioned means to generate when said first voltage signal reaches a preset value.

14. Apparatus according to claim 13 further characterized in that said means to actuate comprises a voltage type relay, one side of the winding of said relay being connected to ground through rectifier means, and means to supply a voltage proportional to said first voltage signal to the other side of said winding of said relay.

15. Apparatus according to claim 13 further characterized in that said second voltage signal rises with respect to time, means to disconnect said second means to generate when said second voltage signal reaches a preset value, said means to disconnect comprising a voltage type relay having an energizing winding, one side of said winding being connected through rectifier means to a negative source of voltage, and a positive voltage corresponding to said second voltage signal being applied to the other side of said winding.

References Cited by the Examiner

UNITED STATES PATENTS

| | | | |
|---|---|---|---|
| 2,727,969 | 12/55 | Platte | 219—97 |
| 2,829,233 | 4/58 | Doutt | 219—97 |
| 2,848,595 | 8/58 | Van Sciver | 219—108 |
| 2,860,231 | 11/58 | Stone | 219—97 |
| 2,875,389 | 2/59 | Morrill et al. | 235—197 |
| 2,939,065 | 5/60 | Matulaitis | 219—69 X |
| 2,963,647 | 12/60 | Dean | 235—197 |

RICHARD M. WOOD, *Primary Examiner.*

MAX L. LEVY, *Examiner.*